though larger than the size of the particles whose number is to be determined.

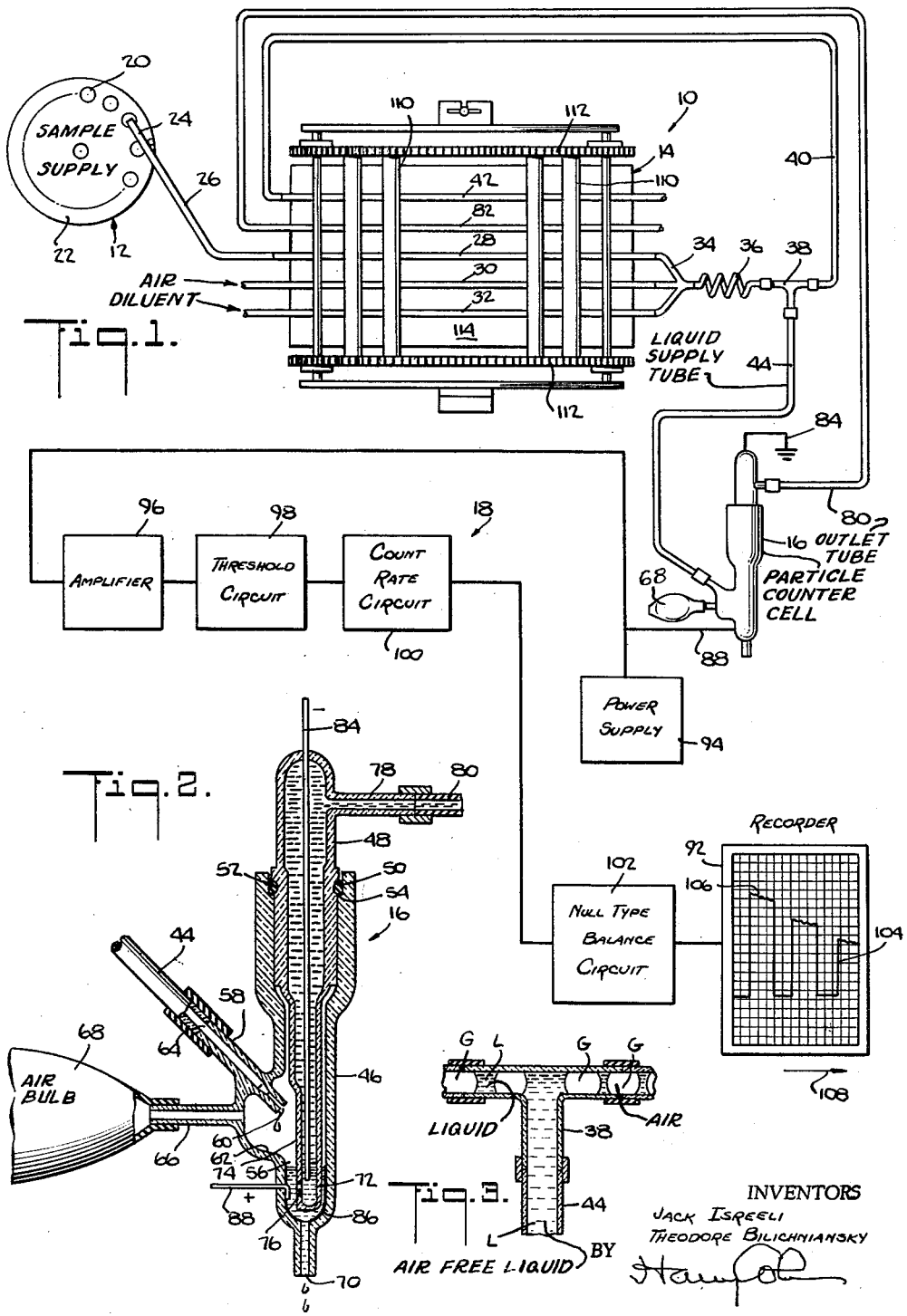

United States Patent Office
3,165,693
Patented Jan. 12, 1965

3,165,693
CONTINUOUSLY OPERABLE APPARATUS AND METHOD FOR COUNTING PARTICLES IN SUCCESSIVE PORTIONS OF A FLOWING FLUID STREAM
Jack Isreeli, Tuckahoe, and Theodore Bilichniansky, Pleasant Valley, N.Y., assignors to Technicon Instruments Corporation, Chauncey, N.Y., a corporation of New York
Filed Feb. 23, 1962, Ser. No. 175,172
13 Claims. (Cl. 324—71)

This invention relates to means for determining the number of particles suspended in a liquid medium and, more particularly, to a method and apparatus for making such determinations continuously.

Heretofore particle counters, whose operation was based on the electrical conductivity difference between the particles and the liquid medium in which they were suspended, effected a particle count by causing a mercury siphon to displace a small predetermined volume of the suspension from a large beaker and measuring the number of particles in the displaced suspension. Due to the necessity of providing separate beakers of liquid, the count determinations could not be accomplished in a continuous fashion and the counts were determined in batch fashion wherein individual beakers of the liquid were intermittently supplied to the counter manually for the count determinations.

The primary object of the present invention is to provide a method and apparatus for continuously determining the number of particles suspended in a liquid medium.

Another object is to provide an apparatus of the above-indicated type whose operation is based on the electrical conductivity difference between the particles and the liquid suspension medium and which is so constructed that clogging is prevented in the constricted flow path for the liquid.

Another object is to provide apparatus, which includes a particle counter cell for determining the number of particles in a liquid, with simple and inexpensive means for providing a predetermined level of liquid in the cell and for automatically controlling the level of the liquid in the cell.

A further object is the provision of a cell which is especially well adapted for use in automatic and continuous particle counters.

The above and other objects, features and advantages of the invention will be more fully understood from the following description of the presently preferred embodiment of the invention considered in connection with the accompanying illustrative drawings.

In the drawings:

FIG. 1 is a more or less diagrammatic view illustrating the method and apparatus of the present invention;

FIG. 2 is a vertical sectional view, on a larger scale, of part of the apparatus shown in FIG. 1; and FIG. 3 is a detailed sectional view, on a larger scale, illustrating another part of the apparatus of FIG. 1.

Referring now to the drawings in detail and particularly to FIG. 1, the apparatus 10 comprises a sample supply device 12, a proportioning pump 14, a particle counter cell 16, and an electrical measuring circuit generally indicated by the reference numeral 18. The liquid samples whose particle contents are to be determined are provided in open top receptacles 20 which are arranged in a circular row on a rotary support plate 22 which is intermittently rotated to position the open top of each sample receptacle below the inlet end of an inlet aspirating tube 26. The inlet tube is pivoted into and out of each receptacle as it is moved into position by the rotation of the support plate 22 and a portion of the sample from each receptacle is aspirated from its respective receptacle by the action of pump 14 and flows as a stream through supply tube 26 and pump tube 28 where it joins a stream of an inert gas, for example air, which is supplied through pump tube 30, and a stream of a diluent, for example distilled water, which is supplied through pump tube 32. The separate streams join each other at fitting 34 and are mixed in the horizontal mixing helical coil 36 to form a segmented stream consisting of a series of liquid segments L consisting of sample liquid and diluent separated from each other by an intervening segment G of air, and this segmented stream is transmitted to the T-connection 38 by the action of the pump.

As seen in FIG. 3, the air segments G are separated from the segmented stream by aspiration at T-connection 38 via tube 40 and pump tube 42, respectively, as shown by FIG. 1 and the sample diluted stream, in consolidated form, flows to the cell 16 via tube 44. The gas segments aid in keeping the internal walls of the various tubes of the apparatus clean and also subdivide each sample into a series of liquid segments which assists in the mixing of the sample with the diluent in the mixing coil 36. Moreover, since the intake tube 24 is removed from the receptacle 20 to permit the succeeding receptacle to be moved into aspirating position, the continuously operating pump 14 draws air into the inlet tube 26 so that each sample is separated from the other by an intervening segment of air and because of the continuous operation of the pump each sample is also separated from each other by an intervening segment of diluent.

Referring now to FIG. 2, the cell 16 is preferably made of heat-resistant glass sold under the trademark "Pyrex" and is of tubular construction. The cell comprises a chamber part 46 and an aspirator part 48 which is positioned in the chamber part in fluid tight relation therewith due to the resilient sealing ring 50. The ring is positioned in a groove 52 provided on the outer upper surface of part 48 and abuts against a shoulder 54 provided on the inner upper surface of part 46.

The lower portion of part 46 is shaped to form a chamber 56 which receives the liquid whose particle content is to be determined. This lower portion is also provided with a downwardly inclined inlet arm 58 having an outlet end 60 positioned above a wall 62 so that the incoming liquid, which is in the form of drops, falls onto the wall and not directly into the liquid in chamber 56 to prevent any disturbance of the liquid. Tube 44 from the T-connection 38 is connected to the inlet end 64 of arm 58 for transmitting the consolidated liquid stream to the particle counter cell. Since the liquid is electrically conductive, the manner of introducing the liquid into the chamber 56 of the cell in the form of separate individual drops which do not fall directly into the liquid, minimizes electrical disturbance of the measuring circuit which might otherwise occur because of possible induced currents in the conductive liquid. The air segments between the samples also reduce the effects of induced currents.

The lower portion of the chamber part 46 is provided with a horizontally extending arm 66 to which is connected a hollow resiliently compressible bulb 68 which is in communication with chamber 56 and is used to control the level of liquid in the chamber as will be more understood hereinafter. The bottom of the chamber is provided with an opening 70 through which excess liquid flows from the chamber in the form of individual drops and also through which passes any foreign matter that may be present in the liquid.

The aspirator part 48 of the cell has its lower portion shaped to form a chamber 72 which is positioned in chamber 56. The wall 74 which separates the chambers is provided with an aperture 76 of relatively small size to form a constricted flow path for the liquid from chamber 56 to chamber 72. The upper portions of the aspirator part is provided with a horizontally extending outlet arm 78 to which a suction tube 80 is connected. The suction tube is connected to aspirating pump tube 82 and it will be understood that the suction tube as well as bulb 68 are sufficiently stiff to resist deformation or collapse under the suction effect of the pump tube 82.

A grounded electrode 84 extends through aspirator part 48 and its lower end is adjacent one side of aperture 76 in chamber 72. The inner wall of chamber 56 is coated with an electrically conductive material 86 and another electrode 88 has one of its ends in contact with the coating 86 and is positioned in the liquid in chamber 56 adjacent the other side of aperture 76. The opposite end of electrode 88 is connected to the previously mentioned measuring circuit 18.

As explained in our co-pending application Serial No. 116,907, filed May 15 1961, and as indicated above, aperture 76 provides a constricted flow path for the liquid from chamber 56 to chamber 72. The conductivity of this flow path changes as an individual particle is carried with the liquid through the aperture because the particle displaces the liquid medium within the aperture and thereby changes the electrical resistance of the aperture contents. This produces a voltage pulse of short duration which has a magnitude proportional to the particle size and this voltage pulse is transmitted to the measuring circuit 18 and is utilized in operating a recorder 92 which records the number of particles in the sample.

The size of the aperture is selected so that only particles of a given size range can pass through the aperture and in this manner the apparatus is able to select and count those particles only which constitute a particular constituent of the liquid, for example white or red corpuscles in whole blood. A diluent is added to the liquid in sufficient quantities to dilute the liquid and thereby reduce the probability of two or more particles passing simultaneously through the aperture 76, since it will be readily apparent that this would still result in a single voltage pulse even though two particles are present in the aperture. The conductivity of the diluent can be selected so that the resulting liquid has a conductivity which is different from the particles suspended therein.

Operation of pump 14 results in the flow of liquid from chamber 56 through aperture 76 into chamber 72 and form said chamber the liquid is transmitted from the cell by suction through tubes 80 and pump tube 82, respectively. The suction effect provided by the pump prevents clogging which may otherwise occur in the relatively small aperture 76, especially in the case of relatively large particles. The suction prevents this clogging and aids in dislodging any particle which may be entrapped in the aperture.

As indicated above bulb 68 is provided for adjusting the level of the liquid in chamber 56 at the commencement of the operation of the particle counter. In actual practice, the liquid level in chamber 56 is predetermined before placing the particle counter in operation for counting blood cells or other particles in such a manner as to avoid the waste of blood or other liquid under test. More particularly, water, for example, is the liquid which is utilized for this purpose. In the initial stage of the operation for predetermining the level of liquid in chamber 56, when the pump 14 is operated air which enters through opening 70 is aspirated through chamber 72 until the liquid, presently water, which is admitted into chamber 56 through tube 44 rises to a point just above the aperture 76 so that liquid will then pass through said aperture from chamber 56 and into chamber 72. It is to be noted that more liquid enters chamber 56 through tubes 28 and 32 than is withdrawn from said chamber through chamber 72 and outlet 78 by pump tube 82. This difference in liquid quantities is discharged from chamber 56 through opening 70. It is desirable to provide a liquid level in chamber 56, for the normal operation of the apparatus, which is higher than the liquid level which obtains as a result of the operation just described. One of the reasons for providing this higher liquid level is to guard against the possibility of clogging of the aperture 76 by particles which might float and collect at the upper surface of the liquid and which, if the liquid level is closely adjacent to the aperture 76, might enter said aperture. For the purpose of raising the level of the liquid in chamber 56 to provide the desired operating level, illustrated by FIG. 2, sufficiently above the aperture 76 to minimize the possibility of clogging the aperture, bulb 68 may be manipulated in a manner which will now be described, it being understood that the apparatus is still being operated with the introduction of water into chamber 56. After the level of liquid in chamber 56 rises to the level immediately above aperture 76, bulb 68 is compressed while liquid continues to flow into chamber 56 through tube 44, and the compression of said bulb is thereafter gradually released resulting in a reduction of pressure in chamber 56 to a value below that of the atmospheric pressure at the outlet 70 so that as liquid continues to flow into chamber 56 no liquid flows through outlet 70 with the result that the liquid rises in said chamber. By proper manual manipulation of bulb 68, namely by partial compression and gradual release of compression while the liquid flows through chamber 56 through tube 44, the level of the liquid in said chamber is conveniently and quickly predetermined. The apparatus is now in condition for examining the liquid in the receptacles 20 to determine the number of particles which they contain and the inlet end of the inlet tube 24 is inserted in one of the receptacles to begin the operation of the apparatus. It is to be noted that except for opening 70, the particle counter cell 16 is closed so that the atmospheric pressure applied at the opening 70 is operative to maintain the level of the liquid in chamber 56.

During operation of the apparatus, the rate of flow of incoming liquid into chamber 56 is somewhat greater than the rate of flow of the outgoing liquid from chamber 72. However, the level of the liquid in chamber 56 remains substantially at the position shown above the aperture 76 because of the atmospheric pressure applied to the closed system through opening 70 and the excess liquid due to the difference in the flow rates flows in the form of drops from chamber 56 through outlet 70. This constant dripping of excess liquid from chamber 56 helps in removing any particles from the chamber which might otherwise tend to clog aperture 76.

The power supply 94 of the measuring circuit comprises a high voltage direct current supply with a high resistance in series with the voltage source so that the currents in the circuit are substantially constant. Accordingly, as the conductivity of the constricted flow path of the liquid changes due to the passage of the particles through the aperture 76, the voltage changes in proportion to the change in resistance of the flow path. This resulting voltage pulse is amplified by the amplifier 96 and the amplified voltage is transmitted to threshold circuit 98. The threshold circuit transmits only those voltage pulses which are above a predetermined magnitude corresponding to a particle of a particular size. The transmitted voltage pulses are received by a count rate circuit 100 which provides a voltage that is proportional to the rate of flow of the particles through the aperture 76. Since this rate of flow is approximately proportional to the quantity of particles present in a predetermined volume of liquid, the voltage provided by circuit 100 is a measure of the number of particles in the sample. This voltage is supplied to one side of a null-type balancing circuit 102 and the difference in voltage between the measuring side of the circuit and the constant voltage side of the circuit is applied to the motor of the recorder 92 which operates a stylus to produce a recording 104 which is indicative of a number of particles in the sample. It will be noted that the recording consists of peaks 106 separated from each other in the direction of movement of the chart paper indicated by the arrow 108. Each peak represents the number of particles in a sample and the separation between peaks is due to the fact that the samples are separated from each other by a segment of diluent and during the passage of diluent through the cell 16, no peaks occur. In this manner, each sample can easily be distinguished from the other on the chart paper of the recorder and a continuous recording of the number of particles in each sample is continuously provided.

It is within the scope of the invention to utilize the apparatus for continually monitoring a continuous stream of liquid to determine the number of particles present in the stream. This can easily be accomplished by connecting the intake tube 26 to an offtake from a conduit in which a stream is flowing and continuously transmitting a portion of said stream through tube 26. Of course, when the apparatus is used to monitor a stream, a sample supply device 12 is not used.

The sample supply device may be of the type shown in the U.S. application of Jack Isreeli, Serial No. 666,403, filed June 18, 1957, and assigned to the assignee of the present application, now Patent No. 3,038,340.

The various circuits comprising the measuring means 18 have not been described in detail since they are well known circuits and their details do not, per se, form a part of this invention.

The proportioning pump 14 is preferably of the type shown in U.S. Patent No. 2,935,028, issued May 3, 1960. Briefly described, the pump comprises a series of compressing rollers 110 whose ends are connected to sprocket chains 112 which move the rollers longitudinally of the flexibly resilient pump tubes. During this movement, the pump tubes are compressed along their lengths by the rollers against a platen 114 for the pumping operation. Since the pump tubes are closed by their engagement with the rollers, it will be observed that the tubes connected to the particle counter cell 16 are not exposed to the atmosphere.

While the invention has wide application for industrial uses for the counting of minute particles distributed in various fluids, it is considered to have important clinical uses especially for counting blood cells in blood specimens whereby to eliminate the tedious methods which involve the counting of blood cells by a technician with the required aid of a microscope. Also, it will be understood that by reason of the fact that the invention provides for and makes possible the examination of a series of specimens or samples one after another flowing in a stream through the apparatus, the present apparatus and method greatly reduce the time required for making blood counts besides eliminating the tedious work referred to and greatly reducing the chances of error.

This application relates in subject matter to our above mentioned co-pending application, Serial No. 116,907, filed May 15, 1961. It is within the scope of the present invention to employ anti-clogging devices described in our co-pending application in the apparatus described in the present application.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

We claim:

1. Particle counting apparatus for continuously determining the number of particles in a liquid having a different electrical conductivity than said particles, said apparatus comprising:

(a) a cell having first and second chambers separated from each other by a wall having an aperture therein forming a constricted flow path for the liquid from said first chamber to said second chamber, (b) said first chamber having a liquid inlet and said second chamber having a liquid outlet, (c) means connected to said inlet for transmitting a stream of liquid to said first chamber, (d) means connected to said outlet for causing flow of the liquid through said constricted flow path to said outlet, (e) means for measuring the electrical conductivity of said flow path during the flow of the liquid therethrough as a measurement of the number of particles in said liquid, and (f) means in communication with said first chamber for varying the pressure therein and thereby controlling the level of liquid in said first chamber.

2. Particle counting apparatus for continuously determining the number of particles in a liquid having a different electrical conductivity than said particles, said apparatus comprising:

(a) a cell having first and second chambers separated from each other by a wall having an aperture therein forming a constricted flow path for the liquid from said first chamber to said second chamber, (b) said first chamber having a liquid inlet and said second chamber having a liquid outlet, (c) means connected to said inlet for transmitting a stream of liquid to said first chamber, (d) means connected to said outlet for causing flow of the liquid through said constricted flow path to said outlet, (e) means for measuring the electrical conductivity of said flow path during the flow of the liquid therethrough as a measurement of the number of particles in said liquid, and (f) means in communication with said first chamber for varying the pressure therein and thereby controlling the level of liquid in said first chamber, (g) said liquid level controlling means comprising a hollow resiliently compressible member adapted to be compressed and released from compression to vary the pressure in said first chamber.

3. Particle counting apparatus for continuously determining the number of particles in a liquid having a different electrical conductivity than said particles, said apparatus comprising:

(a) a cell having first and second chambers separated from each other by a wall having an aperture therein forming a constricted flow path for the liquid from said first chamber to said second chamber, (b) said first chamber having a liquid inlet and said second chamber having a liquid outlet, (c) means connected to said inlet for transmitting a stream of liquid to said first chamber, (d) means connected to said outlet for causing flow of the liquid through said constricted flow path to said outlet, (e) means for measuring the electrical conductivity of said flow path during the flow of the liquid therethrough as a measurement of the number of particles in said liquid, and (f) means in communication with said first chamber for varying the pressure therein and thereby controlling the level of liquid in said first chamber, (g) said liquid level controlling means comprising a hollow resiliently compressible member adapted to be compressed and released from compression to vary the pressure in said first chamber, (h) said first chamber having an opening exposed to the atmosphere for maintaining liquid in said first chamber by atmospheric pressure exerted on the liquid at said opening.

4. Particle counting apparatus for continuously determining the number of particles in a liquid having a different electrical conductivity than said particles, said apparatus comprising:
 (a) a cell having first and second chambers separated from each other by a wall having an aperture therein forming a constricted flow path for the liquid from said first chamber to said second chamber,
 (b) said first chamber having a liquid inlet and said second chamber having a liquid outlet,
 (c) means connected to said inlet for transmitting a stream of liquid to said first chamber,
 (d) suction means connected to said outlet for causing flow of the liquid through said constricted flow path to said outlet,
 (e) means for measuring the electrical conductivity of said flow path during the flow of the liquid therethrough as a measurement of the number of particles in said liquid, and
 (f) means in communication with said first chamber for varying the pressure therein and thereby controlling the level of liquid in said first chamber.

5. Particle counting apparatus for continuously determining the number of particles in a liquid having a different electrical conductivity than said particles, said apparatus comprising:
 (a) a cell having first and second chambers separated from each other by a wall having an aperture therein forming a constricted flow path for the liquid from said first chamber to said second chamber,
 (b) said first chamber having a liquid inlet and said second chamber having a liquid outlet,
 (c) means connected to said inlet for transmitting a stream of liquid to said first chamber,
 (d) suction means connected to said outlet for causing flow of the liquid through said constricted flow path to said outlet,
 (e) means for measuring the electrical conductivity of said flow path during the flow of the liquid therethrough as a measurement of the number of particles in said liquid, and
 (f) means in communication with said first chamber for varying the pressure therein and thereby controlling the level of liquid in said first chamber,
 (g) said liquid level controlling means comprising a hollow resiliently compressible member adapted to be compressed and released from compression to vary the pressure in said first chamber,
 (h) said first chamber having an opening exposed to the atmosphere for maintaining liquid in said first chamber by atmospheric pressure exerted on the liquid at said opening.

6. A particle counter cell for determining the number of particles in a liquid, comprising:
 (a) first and second chambers separated from each other by a wall having an aperture therein forming a constricted flow path for the liquid from said first chamber to said second chamber,
 (b) said first chamber having an inlet for the liquid,
 (c) said second chamber having an outlet for the flow of the liquid from said cell after passing through said aperture,
 (d) an electrode in said first chamber at one side of said aperture and another electrode in said second chamber at the other side of said aperture for sensing changes in conductivity of the liquid as it and a particle therein flow through said aperture, and
 (e) means in communication with said first chamber for varying the pressure therein and thereby controlling the level of liquid in said first chamber.

7. A particle counter cell for determining the number of particles in a liquid comprising:
 (a) first and second chambers separated from each other by a wall having an aperture therein forming a constricted flow path for the liquid from said first chamber to said second chamber,
 (b) said first chamber having an inlet for the liquid and a wall in the path of flow of the incoming liquid to prevent the latter from falling directly on the liquid in said chamber,
 (c) said second chamber having an outlet for the flow of the liquid from said cell after passing through said aperture, and
 (d) an electrode in said first chamber at one side of said aperture and another electrode in said second chamber at the other side of said aperture for sensing changes in conductivity of the liquid as it and a particle therein flow through said aperture.

8. A particle counter cell for determining the number of particles in a liquid, comprising:
 (a) first and second chambers separated from each other by a wall having an aperture therein forming a constricted flow path for the liquid from said first chamber to said second chamber,
 (b) said first chamber having an inlet for the liquid,
 (c) said second chamber having an outlet for the flow of the liquid from said cell after passing through said aperture,
 (d) an electrode in said first chamber at one side of said aperture and another electrode in said second chamber at the other side of said aperture for sensing changes in conductivity of the liquid as it and a particle therein flow through said aperture, and
 (e) means in communication with said first chamber for varying the pressure therein and thereby controlling the level of liquid in said first chamber,
 (f) said liquid level controlling means comprising a hollow resiliently compressible member adapted to be compressed and released from compression to vary the pressure in said first chamber.

9. A particle counter cell for determining the number of particles in a liquid, comprising:
 (a) first and second chambers separated from each other by a wall having an aperture therein forming a constricted flow path for the liquid from said first chamber to said second chamber,
 (b) said first chamber having an inlet for the liquid,
 (c) said second chamber having an outlet for the flow of the liquid from said cell after passing through said aperture,
 (d) an electrode in said first chamber at one side of said aperture and another electrode in said second chamber at the other side of said aperture for sensing changes in conductivity of the liquid as it and a particle therein flow through said aperture, and
 (e) means in communication with said first chamber for varying the pressure therein and thereby controlling the level of liquid in said first chamber,
 (f) said liquid level controlling means comprising a hollow resiliently compressible member adapted to be compressed and released from compression to vary the pressure in said first chamber,
 (g) said first chamber having an opening exposed to the atmosphere for maintaining liquid in said first chamber by atmospheric pressure exerted on the liquid at said opening.

10. A particle counter cell for determining the number of particles in a liquid, comprising:
 (a) first and second chambers separated from each other by a wall having an aperture therein forming a constricted flow path for the liquid from said first chamber to said second chamber,
 (b) said first chamber having an inlet for the liquid,
 (c) said second chamber having an outlet for the flow of the liquid from said cell after passing through said aperture,
 (d) means for measuring the electrical conductivity of said flow path during the flow of the liquid therethrough as a measurement of the number of particles in said liquid, said measuring means comprising:

(e) a layer of electrically conducting material on the inner surface of said first chamber, (f) an electrode positioned in said first chamber in contact with said surface, (g) another electrode positioned in said second chamber, and means in communication with said first chamber for varying the pressure therein and thereby controlling the level of liquid in said first chamber.

11. A method of continuously determining the number of particles in a liquid having a different electrical conductivity than said particle, said method comprising:

(a) providing a particle counter cell having a first chamber provided with an outlet opening and a second chamber separated from said first chamber by a wall having an aperture therein forming a constricted flow path for the liquid from said first chamber to said second chamber, (b) transmitting liquid to said first chamber at one flow rate to provide liquid therein at a level which is above said aperture so that liquid flows into said second chamber through said aperture, and transmitting liquid from said second chamber at a rate of flow which is less than said one flow rate, whereby the excess liquid due to said difference in flow rates flows from said first chamber through said outlet opening, (c) varying the pressure on the liquid in said first chamber during the flow of the liquids to raise the level of the liquid in said first chamber to a position above said first mentioned level, and thereafter (d) electrically measuring the changes in conductivity in said constricted flow path.

12. A method of continuously determining the number of particles in a liquid having a different electrical conductivity than said particles, said method comprising:

(a) providing a particle counter cell having a first chamber provided with an outlet opening exposed to atmosphere and a second chamber separated from said first chamber by a wall having an aperture therein forming a constricted flow path for the liquid from said first chamber to said second chamber, (b) transmitting liquid to said first chamber at one flow rate to provide liquid therein at a level which is above said aperture so that liquid flows into said second chamber through said aperture, and transmitting liquid from said second chamber at a rate of flow which is less than said one flow rate, whereby the excess liquid due to said difference in flow rates flows from said first chamber through said outlet opening, (c) reducing the pressure on the liquid in said first chamber during the flow of the liquids to a value below atmospheric pressure so that atmospheric pressure on said liquid in said first chamber at said outlet opening prevents flow of the excess liquid from said first chamber and the level of liquid therein rises to a position above said first mentioned level, and thereafter (d) electrically measuring the changes in conductivity in said constricted flow path.

13. A method of continuously determining the number of particles in a liquid having a different electrical conductivity than said particles, said method comprising:

(a) providing a particle counter cell having a first chamber provided with an outlet opening exposed to atmosphere and a second chamber separated from said first chamber by a wall having an aperture therein forming a constricted flow path for the liquid from said first chamber to said second chamber, said first chamber having a compressible member connected thereto in fluid flow communication therewith, (b) transmitting liquid to said first chamber at one flow rate to provide liquid therein at a level which is above said aperture so that liquid flows into said second chamber through said aperture, and transmitting liquid from said second chamber at a rate of flow which is less than said one flow rate, whereby the excess liquid due to said difference in flow rates flows from said first chamber through said outlet opening, (c) compressing said member while liquid is flowing into said first chamber and thereafter gradually releasing said compressed member to reduce the pressure on the liquid in said first chamber to a value below atmospheric pressure so that atmospheric pressure on said liquid in said first chamber at said outlet opening prevents flow of the excess liquid from said first chamber and the level of liquid therein rises to a position above said first mentioned level, and thereafter (d) electrically measuring the changes in conductivity in said constricted flow path.

References Cited by the Examiner

UNITED STATES PATENTS

| | | | |
|---|---|---|---|
| 2,656,508 | 10/53 | Coulter | 324—71 |
| 2,869,078 | 1/59 | Coulter et al. | 324—71 |

FREDERICK M. STRADER, *Primary Examiner.*

WALTER L. CARLSON, *Examiner.*